Dec. 29, 1931.  J. HOLLOWAY  1,838,224
VELOCIPEDE
Filed July 22, 1930

Inventor
Joseph Holloway.

Attorney

Patented Dec. 29, 1931

1,838,224

UNITED STATES PATENT OFFICE

JOSEPH HOLLOWAY, OF BLAIR, NEBRASKA

VELOCIPEDE

Application filed July 22, 1930. Serial No. 469,804.

This invention relates to improvements in velocipedes, particularly adapted for children's use.

The primary object of this invention, is to provide an attachment for a conventional form of velocipede for converting the same into a wagon, whereby articles and parcels may be carried by the rider of the velocipede.

A still further object of this invention, is to provide a device of the above mentioned character having a dump body which may be raised or tilted in order that the load therein may be dumped through the end gate which is simultaneously opened upon tilting of the body.

A still further object of this invention, is to provide a novel form of locking linkage for holding the dumping body in its normal position.

A still further object of this invention is to provide an attachment for a conventional form of tricycle which may be readily attached to the rear frame thereof for converting the velocipede or tricycle into a wagon or parcel carrier.

Figure 1:
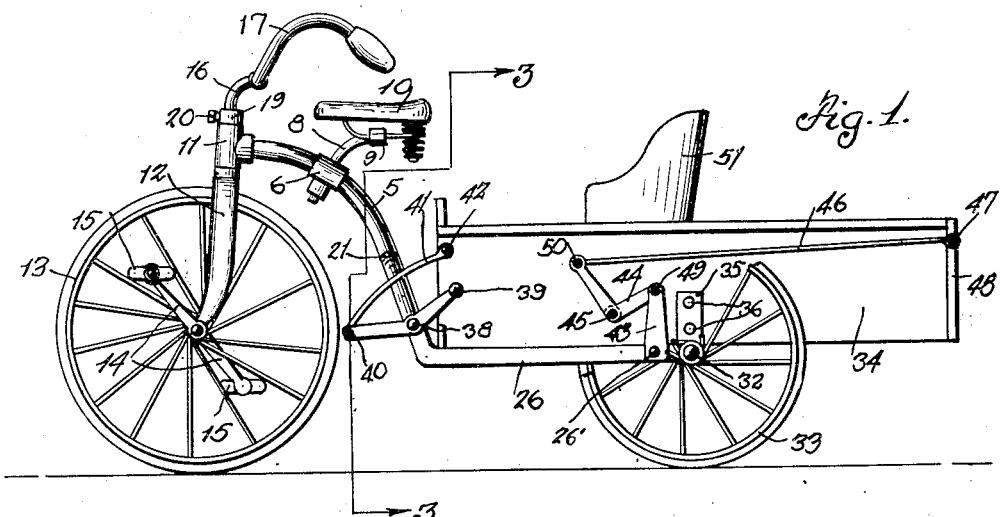
Figure 2:
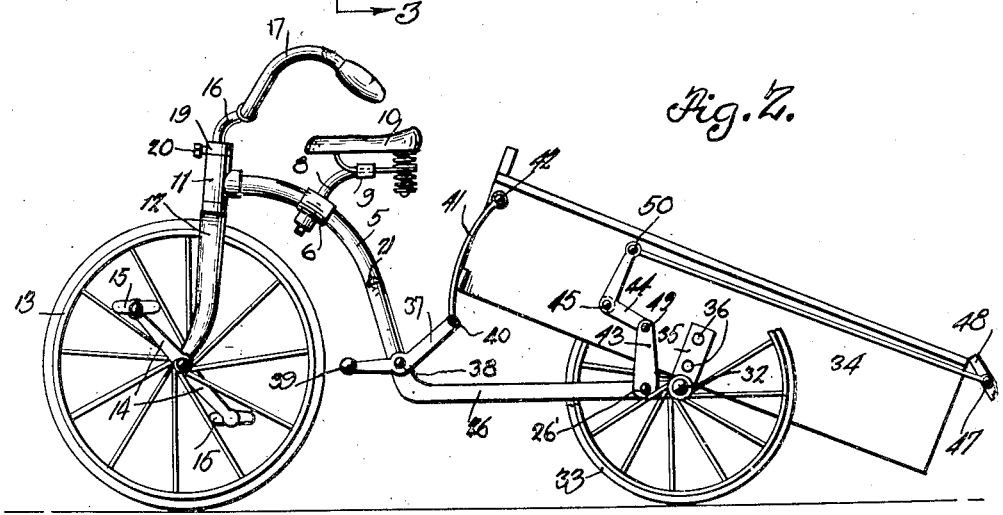
Figure 3:
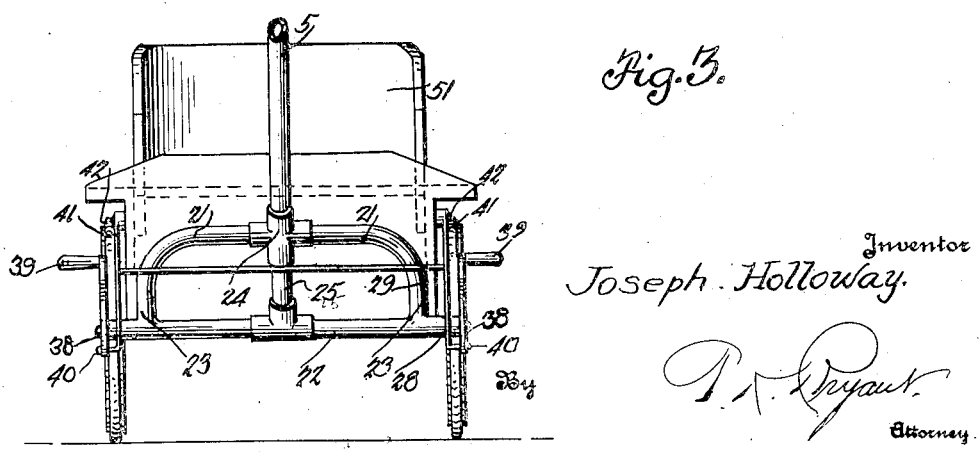

Other objects and advantages of the invention will become apparent during the course of the following description, forming a part of this specification and in which, Figure 1 is a side elevational view of the invention illustrating the manner in which the attachment is secured to the rear frame of the velocipede after the rear axle and wheels have been removed;

Figure 2 is a similar view showing the attached vehicle body in its tilted or dumping position; and Figure 3 is a vertical cross-sectional view taken on line 3—3 of Figure 1, illustrating the connecting links of the dumping body associated with the rear frame parts of the velocipede.

In the drawings, wherein a preferred embodiment of the invention is illustrated, and wherein like reference characters are employed to designate like parts throughout the same, the reference character 5 will generally be employed to designate the rear frame bar in the conventional form of tricycle or velocipede having a sleeve 6 for receiving the neck 8 of the seat holder 9 upon which is supported a seat saddle 10. The upper end of the frame bar 5 is provided with a T-joint 11 for receiving the reduced end of the wheel portion 12 in which is rotatably mounted a wheel 13 upon a crank 14 which is provided with foot pedals 15. A goose neck 16 is received in the reduced end of the fork 12 for supporting the usual handle bars 17 while a collar 19 is held in place upon the reduced end of the fork 12 by means of a set screw 20. The lower end of the frame 5 is provided with angle bars 21 which are formed integral with an axle housing 22 as at 23 and are connected at their opposite end to a cross connection 24. A brace bar 25 also connects the axle housing 22 and the cross connection 24 for strengthening and bracing the construction.

The invention comprises a pair of side bars 26 formed integral with the axle housing at a point adjacent the axle housing. In this manner, the side bars 26 are held rigidly secured to the axle housing 22 at the forward end thereof while the rear ends of the side bars 26 are provided with a transverse axle 32 upon which is rotatably mounted a set of rubber tired wheels 33. Supported on the axle 32 is a wagon body 34 by means of side plates 35 held to the wagon body by means of screws or the like 36 through which passes the axle 32 whereby the wagon body 34 will be allowed to tilt rearwardly as illustrated in Figure 2.

Pivotally secured to each side of the frame 21 is a bell crank 37 by means of the axle 38 and the bell crank 37 is provided with a handle 39 at one end while the opposite end of the bell crank is provided with a pin 40 for receiving one end of a link 41 which has its opposite end secured to the wagon body 34 as at 42, whereby movement of the handle 39 about the pivot point 38 will cause the link 41 to be moved up or down as illustrated in Figures 1 and 2 and when the bell crank 37 is in the position shown in Figure 1, the lower end of the link 41 is off center from the pivot point 38 whereby the wagon body 34 will be held or locked in its normal position.

Pivotally secured to each of the side bars 26 adjacent the wagon body support as at 26' is a pair of vertical extensions 43 which have their upper ends connected to a bell crank 44 pivotally carried by the side walls of the wagon body 34 as at 45. The opposite end of the bell crank 44 is connected to a rod 46 which has its opposite end connected as at 47 to a hinged tail gate 48 hinged to the rear of the wagon body 34 in the usual manner. Rivets or bolts 49 and 50 may be provided for connecting the vertical extensions 43 to the bell crank 44 and the rod 46 and bell crank 44 respectively. It will readily be observed that the tail gate 48 will be raised or moved away from the wagon body simultaneous with the tilting thereof by operation of the bell crank 37 and lever 41.

If desired, a removable seat 51 may be supported in the wagon body 34 whereby occupants may ride therein as illustrated in Figure 1.

It is to be understood that various changes in the shape, size and arrangement of the attachment may be resorted to without departing from the spirit of the invention, or the scope of the subjoined claims.

Having thus described the invention, what is claimed is:—

1. A velocipede of the character described, comprising a main frame member having side bars, a pair of handle bars connected to the lower portion of the main frame member, an axle connecting the opposite ends of each of the side bars, a pair of brackets pivotally carried by the axle, a rectangular wagon body rigidly secured to the brackets, a rear tail gate hingedly secured to the rear portion of the wagon body, means for raising and lowering the wagon body comprising a pivoted bell crank on each side of the main frame member, a curved link connecting one end of the bell crank to the forward end of the wagon body whereby movement of the bell crank in a counter-clockwise direction will cause the wagon body to be lowered and locked into its normal position, and means for simultaneously opening and closing the tail gate upon raising and lowering of the wagon body.

2. A velocipede of the character described, comprising a main velocipede frame, side bars rigidly secured to the lower portion of the velocipede frame, a rear axle connecting the ends of the side bars, a set of wheels rotatably mounted on the axle, a pair of brackets pivotally carried by the axle, a wagon body rigidly secured to the brackets, a hinged tail gate for the rear end of the wagon body, an extension formed on each of the side bars adjacent the rear axle, a bell crank pivotally carried by the side walls of the wagon body, said bell crank having one of its ends connected to the vertical extension, and its opposite end connected to the tail gate whereby tilting of the wagon body will cause the tail gate to be moved into its open and closed position, and means for locking the wagon body in its normal position.

3. A velocipede of the character described, comprising a main frame, side bars secured to the lower portions of the main frame, an axle extending across the rear end of each of the side bars, wheels rotatably mounted on the axle, a pair of brackets pivotally carried by the axle, a wagon body, secured to and between the brackets, a hinged tail gate for the wagon body, a vertical extension formed on the rear portion of each of the side bars in close proximity to the axle, a bell crank pivotally secured to the side walls of the wagon body, and having one of its ends connected to the vertical extension, a connecting rod pivotally secured to the tail gate and having its opposite ends connected to the bell crank whereby tilting of the wagon body will cause the opening and closing of the tail gate, a second crank pivotally secured to the side bars of the main frame, a pivotally curved link having one of its ends secured to the wagon body and its opposite ends secured to one end of the second bell crank, whereby the movement of the second bell crank about its pivot point will cause the wagon body to be raised and lowered and locked when in its normal position.

4. A velocipede of the character described, comprising a main frame, a pair of side bars rigidly secured to the lower portion of the main frame, an axle connecting the free ends of the side bars, a pair of wheels rotatably mounted on the axle, a pair of brackets pivotally carried by the axle, a wagon body secured to and between the brackets, a tail gate for the rear end of the wagon body, said tail gate being pivotally secured to the side walls of the wagon body, a vertical extension formed on the side bars adjacent the transverse axle, a bell crank pivotally secured to the side walls of the wagon body and having one of its ends pivotally secured to the vertical extension, a connecting rod connecting the opposite end of the bell crank to the tail gate in a pivotal fashion, whereby tilting of the wagon body will cause the tail gate to be moved into its open and closed position, a second bell crank pivotally secured to the lower portion of the main frame on each side thereof, a curved link having one of its ends connected to the second bell crank and its other end connected to the wagon body by means of pivot pins, and handle formed on the second bell crank for moving the second bell crank about its pivot point for raising and lowering the tilting body into its dumping and locked position.

In testimony whereof I affix my signature.
JOSEPH HOLLOWAY.